United States Patent [19]

Lin

[11] Patent Number: 5,749,354
[45] Date of Patent: May 12, 1998

[54] FRAME FOR A TABLETOP BARBECUE GRILL

[76] Inventor: Patrick Lin, 3rd Fl., No. 128, Sec. 3, Minsheng E. Rd., Taipei, Taiwan

[21] Appl. No.: 867,920

[22] Filed: Jun. 3, 1997

[51] Int. Cl.[6] .................................................. F24B 3/00
[52] U.S. Cl. .............................................. 126/25 R
[58] Field of Search .................................. 126/25 R

[56] References Cited

U.S. PATENT DOCUMENTS 4,582,041   4/1986   Erickson ........................... 126/25 R Primary Examiner—Carroll Dority
Attorney, Agent, or Firm—Abelman, Frayne & Schwab

[57] ABSTRACT

A frame for a tabletop barbecue grill including a pair of supporting panels respectively mounted between legs of a frame of a tabletop barbecue grill, which can firmly and stably support a fire bowl of the tabletop barbecue grill and securely hold a removable ash catcher, whereby avoiding overturn thereof.

9 Claims, 4 Drawing Sheets

FRAME FOR A TABLETOP BARBECUE GRILL

BACKGROUND OF THE INVENTION

1. Field of the Invention

The present invention relates to a frame for a tabletop barbecue grill, more particularly, to a frame for supporting a fire bowl of the tabletop barbecue grill, wherein the frame is firm, stable and not prone to collapse, and has an ash catcher securely mounted thereon.

2. Description of Related Art

A tabletop barbecue grill is usually used for outdoor activities, such as picnics, camping, backyard parties and tailgating, so that people can cook on the tabletop barbecue grill.

Referring to FIG. 1, a conventional tabletop barbecue grill comprises a fire bowl 10 with a lid 12, a cooking grid (referring to FIG. 2) can be mounted in the fire bowl 10 for roasting thereon, a frame 20 having a pair of legs 22 supporting the fire bowl 10, and an ash catcher (not shown), which appears as a typically shallow bowl, is disposed on the interconnects 223 respectively between two branches 221 of the respective legs 22 of the frame 20.

Since the fire bowl 10 containing charcoal briquettes is usually considerably heavy and the legs 22 of the frame 20 are thin, the fire bowl 10 is subject to collapse.

Moreover, the ash catcher is so placed on the interconnects 223, and therefore is prone to overturn, resulting in the ash therein being scattered everywhere.

SUMMARY OF THE INVENTION

The ideal frame for a tabletop barbecue grill should have two functions as follows:

1. Firmly and stably supporting the grill to prevent collapse while cooking; and
2. Securely containing the ash catcher and allowing for easy removal whenever necessary.

Accordingly, one object of the present invention is to provide a frame for a tabletop barbecue grill, which can firmly and stably support a fire bowl of the tabletop barbecue grill.

Another object of the present invention is to provide a frame for a tabletop barbecue grill which can securely hold an ash catcher whereby avoiding overturn thereof, and the ash catcher can be easily removed when necessary.

In accordance with one aspect of the present invention, the frame for a tabletop barbecue grill comprises a pair of supporting panels respectively mounted between legs of the frame of a tabletop barbecue grill for enhancing the supporting force of the legs to firmly and stably support a fire bowl.

In accordance with another aspect of the present invention, the frame for a tabletop barbecue grill, which comprises a pair of supporting panels each having a projection, and an ash catcher having two opposite slots defined in a periphery thereof. The projections of the supporting panels respectively extend into the slots of the ash catcher, thereby fixing the ash catcher.

Other objects, advantages and novel features of the invention will become more apparent from the following detailed description when taken in conjunction with the accompanying drawings.

DETAILED DESCRIPTION OF PREFERRED EMBODIMENT

Figure 1:
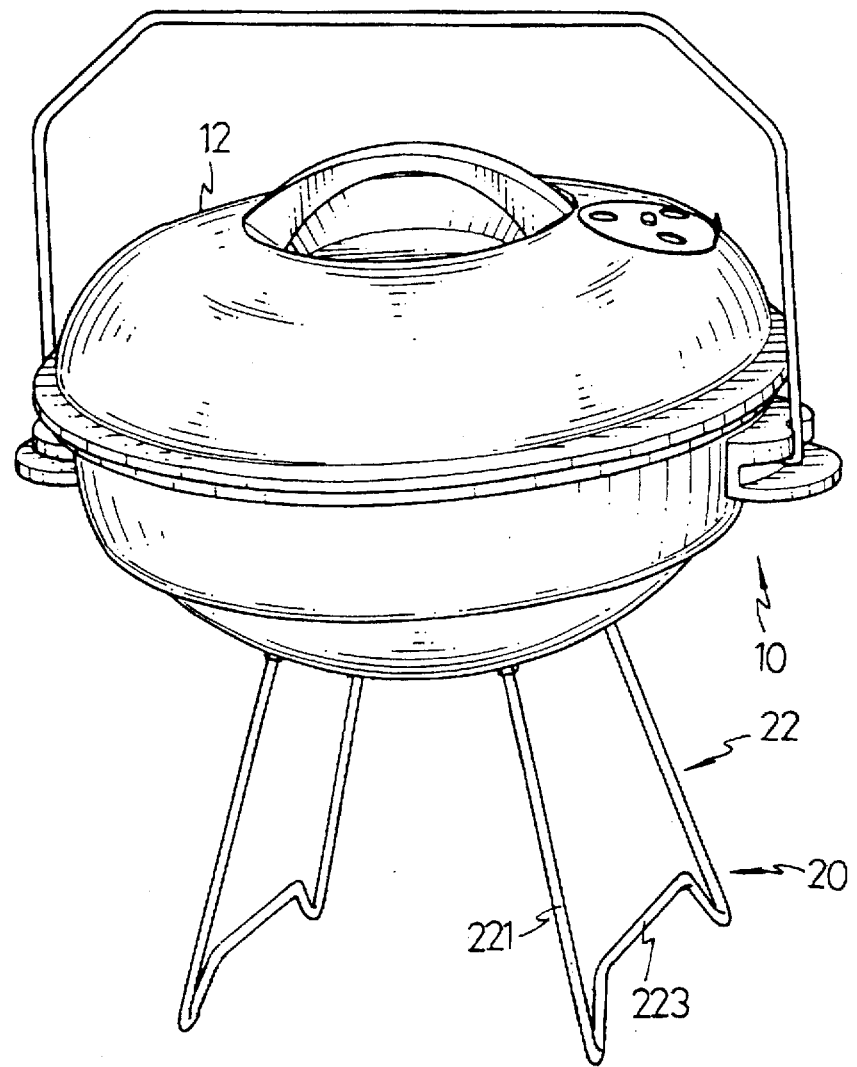
FIG. 1 shows a conventional tabletop barbecue grill.
Figure 2:
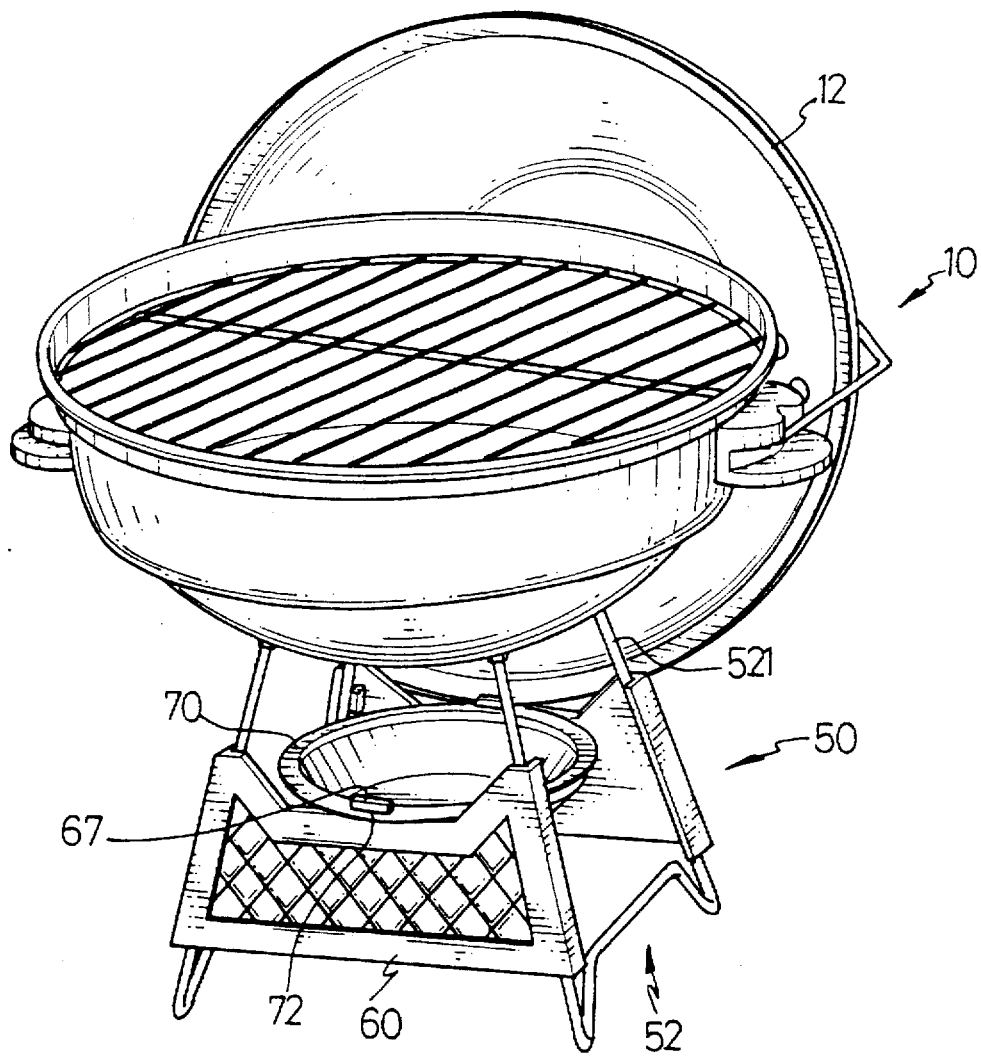
FIG. 2 shows a tabletop barbecue grill and a frame for the tabletop barbecue grill in accordance with the present invention.

Referring to FIG. 2, a fire bowl 10 with a lid 12 of a tabletop barbecue grill is supported by a frame 50. In this drawing, the lid 12 is opened and a cooking grid (with no reference number) is disposed in the fire bowl 10 as shown. The frame 50 comprises a pair of legs 52, each of the legs 52 being substantially U-shape. The frame 50 in accordance with the present invention further comprises a pair of supporting panels 60, each of which is mounted between the two legs 52. In this way, the supporting panels 60 function to fix the two legs 52 and to enhance the supporting force of the frame 50.

Figure 3:
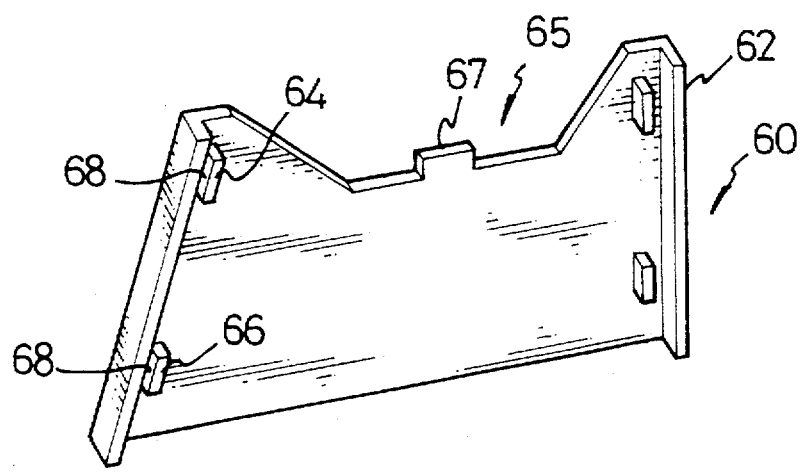
FIG. 3 shows a supporting panel of the frame for the tabletop barbecue grill in accordance with the present invention.

Referring to FIG. 3, showing a back side view of the supporting panel 60, each of the supporting panels 60 forms inter-folded edges 62 at both left and right sides thereof. The supporting panel 60 further forms an upper lugs 64 and a lower lugs 66 aside each edge 62. A width of each of gaps 68 defined between the edges 62 and the lugs 64, 66 is particularly selected so that each branch 521 of the respective legs 52 of the frame 50 can be pressed into the gaps 68 and securely fixed between the edge 62 and the upper lug 64 and lower lug 66.

Figure 4:
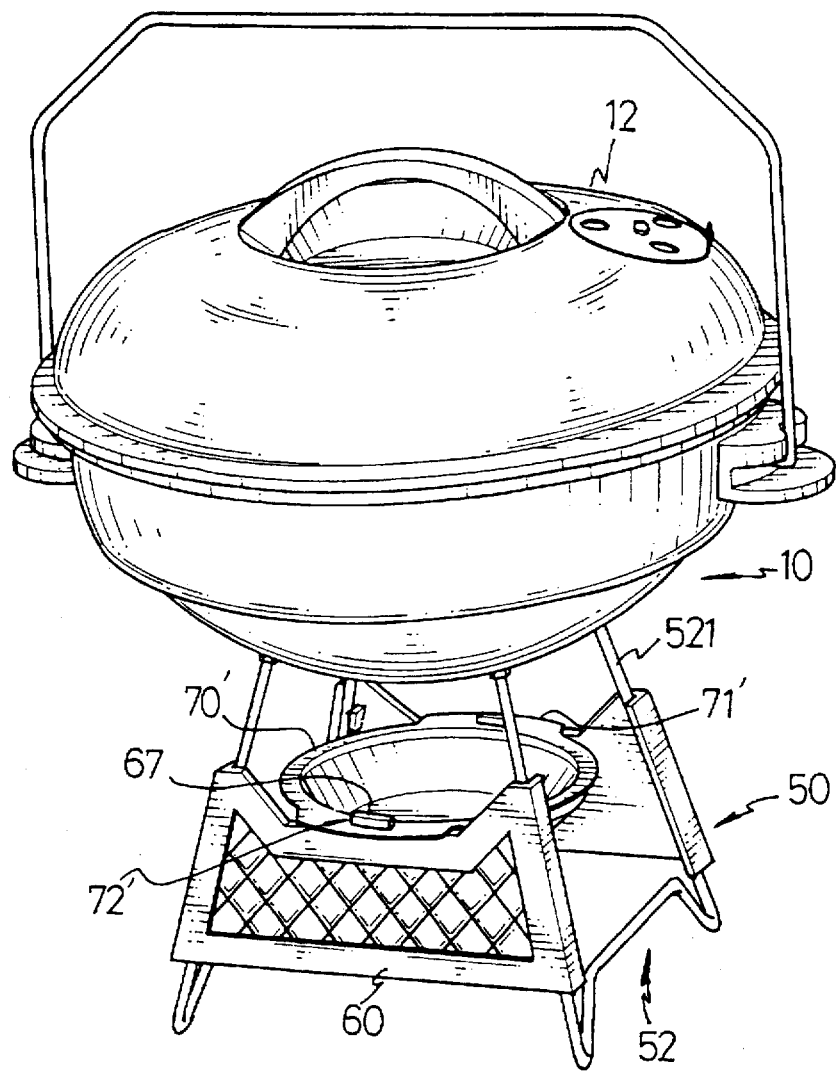
FIG. 4 shows the tabletop barbecue grill and the frame for the tabletop barbecue in accordance with the present invention with an ash catcher different from that in FIG. 2.

Furthermore, an upper side of the supporting panel 60 is concave and defines a concavity 65. A projection 67 is formed in the concavity 65. The frame 50 further comprises an ash catcher 70, which has two opposite slots 72 defined in a periphery thereof. The pair of supporting panels 60 securely and stably support the ash catcher 70 by the two projections 67 each extending into the slots 72 to fix the ash catcher 70, as shown in FIG. 2. The ash catcher 70 can be easily removed by lifting the ash catcher 70 up. The ash catcher can be substantially a round bowl 70 (FIG. 2) having two slots 72 defined in proper positions, or a bowl 70' with two ears 71' (see FIG. 4) wherein two slots 72' are defined in the two ears 71' respectively.

The frame 50 in accordance with the present invention comprising the supporting panels 60, which can be made of plastic or any other suitable material, and the ash catcher 70, can be applied to an existing conventional tabletop barbecue grill.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A frame for a tabletop barbecue grill, said tabletop barbecue grill having a fire bowl with a lid, said frame comprising:

a pair of legs for supporting the fire bowl, each of the legs being substantially U-shape and having two branches; and a pair of supporting panels, each of said supporting panels being mounted between a leg of one pair of the legs and a leg of the other pair of the legs.

2. The frame for a tabletop barbecue grill as claimed in claim 1, further comprising a removable ash catcher mounted on the pair of supporting panels.

3. The frame for a tabletop barbecue grill as claimed in claim 1, wherein each of said supporting panels forms two inter-folded edges at left and right sides thereof, and has at least one lug disposed aside each said inter-folded edge, whereby each branch of the legs can be pressed and fixed between each said inter-folded edge and the nearby lug.

4. The frame for a tabletop barbecue grill as claimed in claim 3, wherein each of the supporting panels has two lugs disposed aside each said inter-folded edge.

5. The frame for a tabletop barbecue grill as claimed in claim 2, wherein each of said supporting panels has a concave top side and a projection formed at said top side, and said ash catcher has two opposite slots defined in a periphery thereof for said projections of the supporting panels to respectively extend into.

6. The frame for a tabletop barbecue grill as claimed in claim 5, wherein said ash catcher is formed as a bowl with two slots.

7. The frame for a tabletop barbecue grill as claimed in claim 5, wherein said ash catcher is formed as a bowl with two ears, and the two slots are defined in the two ears respectively.

8. The frame for a tabletop barbecue grill as claimed in claim 1, wherein said pair of legs are made of steel.

9. The frame for a tabletop barbecue grill as claimed in claim 1, wherein said supporting panels are made of plastic.

\* \* \* \* \*